(12) United States Patent
Shah et al.

(10) Patent No.: US 6,702,570 B2
(45) Date of Patent: Mar. 9, 2004

(54) FIRING METHOD FOR A HEAT CONSUMING DEVICE UTILIZING OXY-FUEL COMBUSTION

(75) Inventors: Minish Mahendra Shah, East Amherst, NY (US); Lawrence E. Bool, III, Hopewell Junction, NY (US); David Richard Thompson, Grand Island, NY (US); Christian Friedrich Gottzmann, Clarence, NY (US); Hisashi Kobayashi, Putnam Valley, NY (US)

(73) Assignee: Praxair Technology Inc., Danbury, CT (US)

( * ) Notice: Subject to any disclaimer, the term of this patent is extended or adjusted under 35 U.S.C. 154(b) by 71 days.

(21) Appl. No.: 10/183,493

(22) Filed: Jun. 28, 2002

(65) Prior Publication Data

US 2004/0002030 A1 Jan. 1, 2004

(51) Int. Cl.⁷ ............................. F23D 11/44; F23L 15/00
(52) U.S. Cl. .................. 431/11; 431/215; 431/115; 95/54; 95/288; 122/1 A
(58) Field of Search ........................ 431/2, 11, 215, 431/210, 207, 326, 170, 7; 95/54, 39, 43, 45, 96; 122/5.51, 1 A, 18.1, 18.2, DIG. 1, DIG. 2

(56) References Cited

U.S. PATENT DOCUMENTS

| | | | |
|---|---|---|---|
| 5,643,354 A | * | 7/1997 | Agrawal et al. ............... 75/490 |
| 5,820,654 A | | 10/1998 | Gottzmann et al. ............ 95/54 |
| 5,855,648 A | * | 1/1999 | Prasad et al. .................. 95/54 |
| 5,888,272 A | | 3/1999 | Prasad et al. .................. 95/54 |
| 5,976,223 A | | 11/1999 | Prasad et al. .................. 95/54 |
| 6,071,116 A | * | 6/2000 | Philippe et al. ............... 431/11 |
| 6,149,714 A | | 11/2000 | Kobayashi ..................... 95/54 |
| 6,382,958 B1 | * | 5/2002 | Bool et al. ..................... 431/2 |
| 6,394,043 B1 | * | 5/2002 | Bool et al. ..................... 95/54 |
| 6,623,714 B2 | * | 9/2003 | Shreiber et al. ............... 95/54 |

FOREIGN PATENT DOCUMENTS

JP    2002-12306 A   *  4/2002   ........... F23L/15/00

* cited by examiner

Primary Examiner—Josiah Cocks
(74) Attorney, Agent, or Firm—David M. Rosenblum

(57) ABSTRACT

A method of firing a heat consuming device such as a boiler or furnace in which an oxygen transport membrane is integrated with the device such that part of the permeated oxygen supports an initial combustion to heat the incoming air to the oxygen transport membrane system. A remaining portion of the oxygen after having been diluted with flue gases from the boiler supports a secondary combustion of fuel within the heat consuming device.

18 Claims, 7 Drawing Sheets

FIRING METHOD FOR A HEAT CONSUMING DEVICE UTILIZING OXY-FUEL COMBUSTION

FIELD OF THE INVENTION

The present invention relates to a method of firing a heat consuming device such as a boiler or furnace in which combustion within the heat consuming device is supported by oxygen separated from air by an oxygen transport membrane. More particularly, the present invention relates to such a firing method in which the separated oxygen also supports combustion to heat an incoming air stream to the oxygen transport membrane and flue gases from the heat consuming device are recirculated to dilute the oxygen being fed to the heat consuming device.

BACKGROUND OF THE INVENTION

Carbon dioxide emissions arising from the combustion of fossil fuels have been identified as major contributors to the increase in the level of greenhouse gases in the earth's atmosphere. This is especially true for the combustion of coal because of the greater carbon content of coal as compared with other types of fuels. Additionally, plants employing coal firing, for instance older electrical utilities, can operate at a lower thermal efficiency than plants fired by liquid fuels to thereby inherently generate more carbon dioxide emissions than liquid fired plants.

Separation and subsequent sequestration of carbon dioxide has been identified as one possible solution for reducing global warming. Sequestration after separation is achieved by compressing the gas to a high pressure and injecting it into deep formations in the ground or the oceans. Unfortunately, common means for removing carbon dioxide from flue gases such as amine scrubbing are expensive. Combustion that relies on oxygen, produced by cryogenic or pressure swing adsorption separation plants, reduces the cost of separating carbon dioxide from the flue gases since the primary combustion product is water which can easily be condensed. However, the costs involved in separating oxygen by cryogenic distillation or pressure swing adsorption makes such practice economically unattractive.

Although the prior art does not directly address the problem outlined above, like considerations have been dealt with in other fields. For instance, in U.S. Pat. No. 5,976,223, an oxygen transport membrane reactor is disclosed that employs ceramic materials to separate oxygen from oxygen-containing feeds. Such ceramic materials, generally perovskites, when heated and subjected to an oxygen partial pressure differential, can function to separate the oxygen from an oxygen-containing feed.

In a well known manner, oxygen is ionized at a cathode side of a membrane formed by a ceramic that can function to separate oxygen. The oxygen ions are transported through the membrane to an anode side thereof. At the anode side of the membrane, the oxygen ions recombine by losing the electrons gained upon ionization. The electrons are then used to ionize oxygen at the cathode side. In certain types of ceramics, known as mixed conductors, both oxygen ions and electrons are conducted. In ceramics known as ionic conductors, only the oxygen ions are conducted and thus, separate electrical pathways are provided for conducting the electrons.

In U.S. Pat. No. 5,976,233, permeated oxygen is combusted with a fuel at the permeate or anode side of the membrane. This combustion of the fuel reduces the oxygen partial pressure at the anode side of the membrane by consuming the permeated oxygen. Carbon dioxide can be recovered from the permeate effluent.

In U.S. Pat. No. 5,888,272, the permeate side of an oxygen transport membrane reactor is purged with combustion products from a downstream process into which fuel is injected. Combustion of the fuel consumes some of the oxygen produced to heat the membrane and to increase the driving force of oxygen through the membrane. The combustion effluent is then introduced into a downstream burner and used to support combustion within the burner and thereby produce the combustion effluent to be recirculated.

U.S. Pat. No. 6,149,714 discloses purging the permeate side of an oxygen transport membrane reactor with a purge gas stream having a low oxygen concentration. This produces an oxidant that is used to support combustion of the fuel and thereby create combustion products. Water can be condensed out of the combustion products and carbon dioxide can be recovered therefrom.

In all of the foregoing references, the incoming air stream must be heated. This heating consumes fuel and thereby produces carbon dioxide. As will be discussed, the present invention provides an integration involving the use of an oxygen transport membrane for oxy-fuel combustion in a heat consuming device in which the air containing the oxygen to be separated is also preheated with an oxy-fuel combustion.

SUMMARY OF THE INVENTION

The present invention relates to a method of firing a heat consuming device. It is to be noted, that the term "heat consuming device" as used herein and in the claims means any device that consumes heat such as a boiler or a furnace.

In accordance with the present invention, air is compressed to form a compressed air stream. After compression, the compressed air stream is heated to form a heated compressed air stream. The compressed air stream is heated at least in part by a first oxy-fuel combustion. As used herein and in the claims, the term "oxy-fuel combustion" indicates a combustion that is supported by oxygen contained within a gaseous mixture that does not contain molecular nitrogen such as in air. The oxygen is separated from the heated compressed air stream by an electrochemical separation process involving oxygen ion transport through a ceramic material to produce an oxygen permeate stream and a retentate stream. The heat consuming device is fired by a second oxy-fuel combustion producing a carbon dioxide-containing flue gas.

The first and second oxy-fuel combustion is supported with oxygen contained in the oxygen permeate. The oxygen is introduced into the second oxy-fuel combustion as a diluted oxygen stream formed by diluting the oxygen permeate with a diluent formed at least in part by recycling part of the carbon dioxide-containing flue gas. A product stream is extracted from the heat consuming device that is formed from a remaining part of the carbon dioxide-containing flue gas. This product stream can then be used in the downstream process or, alternatively, water and carbon dioxide can be separated from the stream for sequestration of the carbon dioxide.

Preferably the oxygen content of the diluted oxygen stream is between about 10 volume percent and about 40 volume percent. More preferably, the oxygen content of the diluted oxygen stream is between about 15 volume percent and about 25 volume percent. This is especially important when retrofitting a heat consuming device.

The oxygen can be separated from the heated compressed air stream within at least one oxygen transport membrane having a retentate side and a permeate side. At least part of the flue gas stream is formed from the part of the carbon dioxide-containing flue gas. The flue gas stream is introduced to the permeate side of the at least one oxygen transport membrane as a sweep gas stream, thereby to form an oxygen-containing sweep gas stream. The oxygen-containing sweep gas stream is introduced into a fired heater to support the first oxy-fuel combustion with a portion of the oxygen contained therein. This produces a combustion product stream. The diluted oxygen-containing stream is formed at least in part by the combustion product stream.

In another embodiment employing at least one oxygen transport membrane and a fired heater, a sweep gas stream is introduced to the permeate side of the at least one oxygen transport membrane to form an oxygen-containing sweep gas stream. Part of the oxygen-containing sweep gas stream and at least part of a flue gas stream, formed from the part of the carbon dioxide-containing flue gas, are introduced into the combustion chamber of the fired heater. This supports the first oxy-fuel combustion and forms the sweep gas stream. The diluted oxygen-containing stream is formed at least in part from a remaining part of the oxygen-containing sweep gas stream.

The preheating of the air can be carried in an oxygen transport membrane combustor-heater. This type of device is illustrated in U.S. Pat. No. 5,820,654. The oxygen is separated from the heated compressed air stream within first and second separations occurring in an oxygen transport membrane separator and an oxygen transport membrane combustor-heater, respectively. Each of the oxygen transport membrane and the oxygen transport membrane combustor-heater has opposed retentate and permeate sides. The compressed air stream is heated and the oxygen transport membrane combustor-heater in a heat exchanger located at the retentate side thereof. The first oxy-fuel combustion comprises a combustion of a fuel within the permeate side of the oxygen transport membrane combustor-heater.

In an embodiment of the present invention that employs an oxygen transport membrane combustor-heater, the fuel stream and at least part of a flue gas stream formed from the part of the carbon dioxide-containing flue gas, are introduced to the permeate side of the oxygen transport membrane combustor-heater as a reactive purge to react with a portion of the oxygen permeate, thereby to produce the first oxy-fuel combustion and a combustion product stream. The first separation produces an intermediate retentate stream that is in turn introduced into the retentate side of the oxygen transport membrane combustor-heater, thereby to affect the second separation and to form the retentate stream. The combustion product stream is introduced to the permeate side of the oxygen transport membrane separator, thereby to form an oxygen-containing combustion product stream. The diluted oxygen-containing stream is formed at least in part by the oxygen-containing combustion product stream.

In an alternative embodiment, the fuel stream, along with at least part of the flue gas stream, formed from at least a portion of the part of the carbon dioxide-containing flue gas, is introduced to the permeate side of the oxygen transport membrane combustor-heater to react with a portion of the oxygen permeate. This produces the first oxy-fuel combustion and a combustion product stream. The first separation produces an intermediate retentate stream. The intermediate retentate stream is expanded with the performance of work, thereby to produce a retentate exhaust stream. The retentate exhaust stream is introduced into the retentate side of the oxygen transport membrane combustor-heater thereby to affect the second separation and to form the retentate stream which can be exhausted from the system after recovery of contained heat or recovered as a nitrogen enriched product. The combustion product stream is introduced to the permeate side of the oxygen transport membrane separator, thereby to form an oxygen-containing combustion product stream. The diluted oxygen-containing stream is formed at least in part by the oxygen-containing combustion product stream.

In a further embodiment the permeate side of the combustor-heater is operated at an elevated pressure. In this regard, such embodiment as well as other embodiments employing a combustor-heater exploit the ability of an oxygen transport membrane to separate and transport oxygen from a lower total pressure to a higher total pressure when the partial oxygen pressure on the retentate side is greater than the oxygen partial pressure on the permeate side. The combustion product stream is withdrawn from the permeate side of the combustor-heater and expanded with the performance of work. Thereafter, the stream is introduced into a flue gas stream formed from at least a portion of the part of the carbon dioxide-containing flue gas. A fuel stream is compressed to form a compressed fuel stream that is introduced to the permeate side of the oxygen transport membrane combustor-heater. The work of expansion is applied at least to the compression of the fuel. Excess power can be used for export power generation. At least part of the flue gas stream, after introduction of the combustion product stream, is heated by the first oxy-fuel combustion and then introduced to the permeate side of the oxygen transport membrane separator, thereby to form an oxygen-containing combustion product stream. The first separation produces an intermediate retentate stream that is expanded with the performance of work to produce a retentate exhaust stream. The retentate exhaust stream is introduced to the retentate side of the oxygen transport membrane combustor-heater, thereby to affect a second separation to form the retentate stream. The diluted oxygen-containing stream is formed at least in part by the oxygen-containing combustion product stream. In such embodiment, the flue gas stream can be formed from the portion of the part of the carbon dioxide-containing flue gas. A further flue gas stream can also be formed from a remaining portion of the part of the carbon dioxide-containing flue gas and the further flue gas stream can be combined with the fuel gas stream prior to compression of the fuel gas stream.

In a yet further embodiment, a combustion product stream can be removed from the permeate side of the oxygen transport membrane combustor-heater and passed into indirect heat exchange with the fuel stream. The combustion product stream can be cooled and water can be separated thereby. Water can be separated from the product stream and after the water separation, the product stream is compressed to form a compressed product stream. The combustion product stream can be introduced into the compressed product stream. At least part of a flue gas stream formed from the part of the oxygen-containing flue gas, is heated by the first oxy-fuel combustion and introduced to the permeate side of the oxygen transport membrane separator as a sweep gas stream. This forms an oxygen-containing sweep gas stream. The first separation produces an intermediate retentate stream that is introduced to the retentate side of the oxygen transport membrane combustor-heater. This affects the second separation and produces the retentate stream. The diluted oxygen-containing stream is formed at least in part by the oxygen-containing sweep gas stream.

In all of the various embodiments of the present invention, heat and energy can be recaptured from the retentate stream and applied to partially heating the compressed air stream and to compress the incoming air stream. In embodiments of the present invention that utilize a fired heater and in the embodiment in which the intermediate retentate stream is introduced in the oxygen transport membrane combustor-heater, the retentate stream can be expanded with the performance of work. The work of expansion can be applied at least to the compression of the air stream. Excess power can be used to generate export power. An exhaust stream, composed of the retentate stream after expansion, can be passed in indirect heat exchange with the compressed air stream to partially heat the compressed air stream. In those embodiments of the present invention in which the intermediate retentate stream is expanded, the work of the expansion can be applied to the compression of the air stream or to generate export power. The retentate stream can be passed in indirect heat exchange with a compressed air stream to partially heat the compressed air stream.

In all embodiments of the present invention, the flue gas stream can be divided into first and second subsidiary flue gas streams. The at least part of the flue gas stream is the first subsidiary flue gas stream. The diluted oxygen-containing stream is also formed from the second subsidiary flue gas stream.

Additionally, the carbon dioxide-containing flue gas can be removed from a stack of the heat consuming device as a stream of the carbon dioxide-containing flue gas. The carbon dioxide-containing flue gas stream can be passed in indirect heat exchange with the compressed air stream and then divided into the flue gas stream and the product stream. The flue gas stream can be reheated in a recuperative heat exchanger located in the stack of the heat consuming device. In all cases, the second oxy-fuel combustion can be combustion of either coal or fuel oil. The heat consuming device can be a boiler.

BRIEF DESCRIPTION OF THE DRAWINGS

While the specification concludes with claims distinctly pointing out the subject matter that applicants' regard as their invention, it is believed that the invention will be better understood when taken in connection with the accompanying drawing in which:

In order to avoid needless repetition, the same reference numbers have been used in the various illustrations to designate elements having the same design and function.

DETAILED DESCRIPTION

Figure 1:
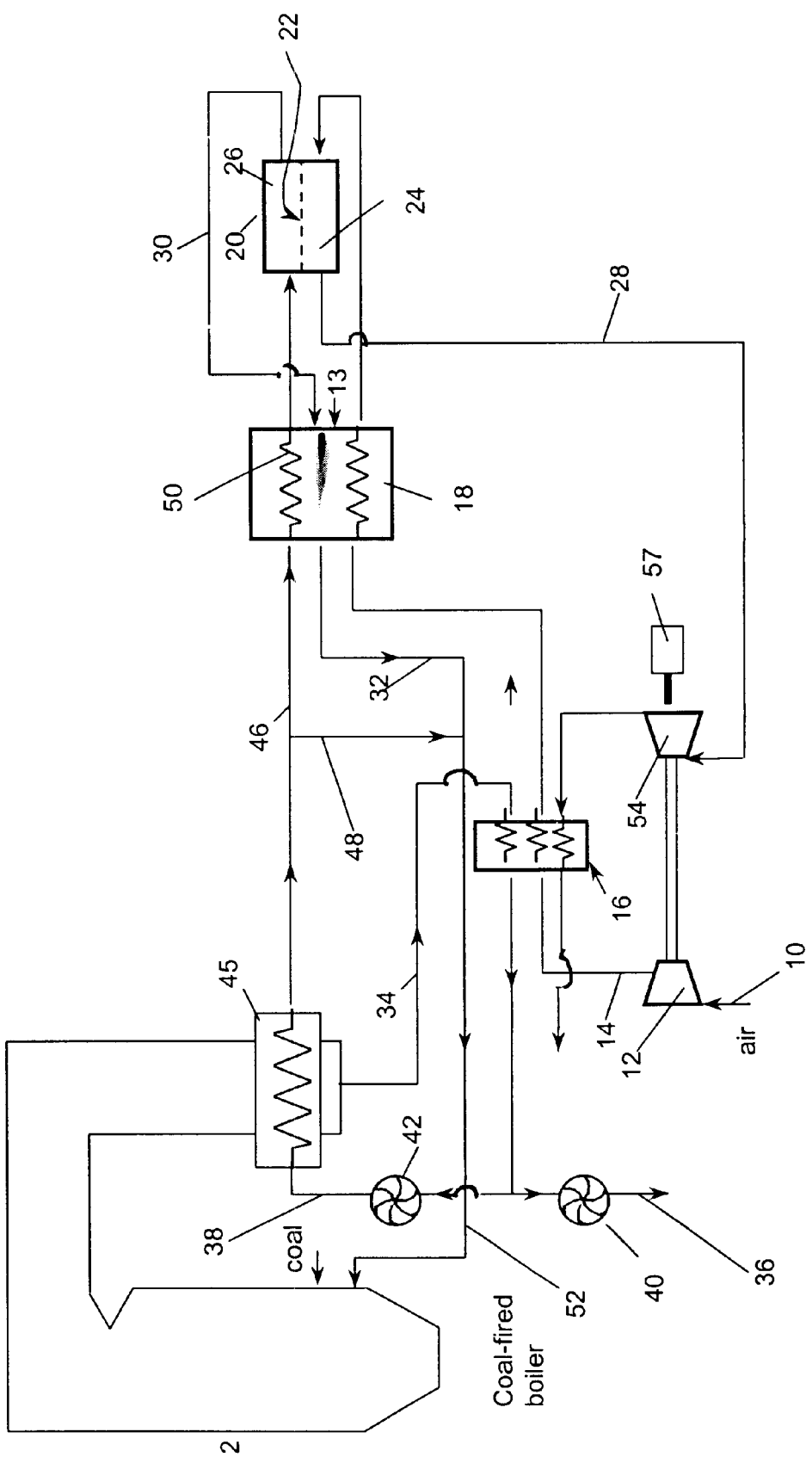
FIG. 1 is a schematic illustration of an apparatus for carrying out a method in accordance with the present invention.

With reference to FIG. 1, an apparatus 1 is illustrated that is designed to fire a boiler 2 by combusting coal in accordance with the present invention. Apparatus 1 is especially suited for retrofitting an existing coal-fired boiler. It is to be noted, however, that although the present invention is discussed in preferred embodiments with respect to boiler 2, it has applicability to any heat consuming device or process. For instance, with very little modification, boiler 2 could be replaced by a furnace.

An air stream 10 is compressed by a compressor 12 to a pressure of between about 40 psia and about 300 psia to form a compressed air stream 14. Compressed air stream 14 is preheated within a recuperative or regenerative heat exchanger 16 and then fully heated by indirect heat transfer from a first oxy-fuel combustion within a fired heater 18 to operating temperature of an oxygen transport membrane separator 20, namely, between about 1400° F. and about 1800° F. A heat exchange pass in the form of a coil 21 is provided within fired heater 18 for such purposes.

The compressed air stream 14, after having been heated, is introduced into oxygen transport membrane separator 20 having one or more oxygen transport membranes such as indicated by reference number 22. Oxygen transport membrane 22 has a retentate side 24 and a permeate side 26. Preferably, compressed air stream 14 after being heated enters retentate side 24 at a temperature of about 1,660° F. to heat oxygen transport membrane 22 to its operational temperature. Approximately about 40 to about 95 percent of the oxygen is separated and collects at permeate side 26 to produce a retentate stream 28 having a pressure of 5 to 10 psi lower than that of compressed air stream 14.

As will be discussed, permeate side 26 of oxygen transport membrane separator 20 is swept by flue gas stream 46 to lower the oxygen partial pressure on permeate side 24 and thereby to increase the driving force for oxygen transport. This produces an oxygen-containing sweep gas stream 30 that is introduced into fired heater 18 to support the first oxy-fuel combustion of fuel 13 therein with part of the permeated oxygen produced within oxygen transport membrane separator 20. This combustion produces a combustion product stream 32 that contains oxygen that in turn will be used to support a second oxy-fuel combustion that will occur through combustion of the coal within boiler 2.

The combustion within boiler 2 produces a carbon dioxide-containing flue gas, that also contains water, which is extracted as a stream 34. Stream 34 can be sent to heat exchanger 16 where some of the residual heat is recovered in heat exchanger 16 to contribute to preheating compressed air stream 14. This though preferred is optional. However, if such residual heat is lost to the environment, fuel consumption is increased. Stream 34 after such heat recovery is divided into a product stream 36 and a flue gas stream 38. Product stream 36 is withdrawn as product for further processing or, after condensing and removing contained water, compressed by for subsequent sequestration. Product stream 36 and flue gas streams 38 are compressed by blower 40 and 42, typically to about 2 to about 6 psig, to overcome pressure losses in subsequent piping circuits.

Flue gas stream 38 is reheated within a flue gas recuperator 45 located in the stack of boiler 2 to about 620° F. As may be appreciated, in this or any of the subsequent embodiments, flue gas recuperator 45 could be deleted. However, the thermal energy loss would have to be compensated for in more fuel usage.

Flue gas stream 38 is divided into first and second subsidiary flue gas streams 46 and 48 respectively. First subsidiary flue gas stream 46 is heated within fired heater 18 by a pass formed by a heat exchange coil 50 to membrane operating temperature of about 1,660° F. Thereafter first subsidiary flue gas stream 46 is passed into permeate side 26 of oxygen transport membrane separator 20 to sweep permeate side 26 and thereby produce oxygen-containing sweep gas stream 30. Oxygen-containing sweep gas stream 30, as stated previously, is introduced into fired heater 18 to produce combustion product stream 32 which is then combined with second subsidiary flue gas stream 48 to thereby form a diluted oxygen-containing stream 52 to support combustion of coal. In this and subsequent embodiments, diluted oxygen-containing stream 52 preferably contains between about 10 volume percent and about 40 volume percent of oxygen. More preferably, the range is between about 15 volume percent and about 25 volume percent of oxygen.

It is to be noted that in this and subsequent embodiments, all of the flue gas stream 38 could be utilized as a sweep gas. However, the lower usage of flue gas stream 38 in the illustrated embodiments has the advantage of reducing the pressure drop in the associated piping and the heat duty of fired heater 18. This in turn reduces the use of natural gas that is preferably used as a fuel for fired heater 18. As can be appreciated, natural gas is a more expensive fuel than the coal used in the firing of boiler 2. A preferred percentage range is one in which first subsidiary flue gas stream 46 constitutes between about 20 percent and about 60 percent of flue gas stream 38.

Preferably, the thermal energy of retentate stream 28 is recovered, rather than discarded. In this regard, retentate stream 28 is introduced into a turboexpander 54 to produce an exhaust stream 56 which is preferably at or near atmospheric pressure. Exhaust stream 56 is passed into recuperative heat exchanger 16 to preheat compressed air stream 14. Turboexpander 54 is coupled to compressor 10 and excess power is withdrawn in a generator 57.

The degree of power that can be recovered from turboexpander 54 relates to the percent oxygen recovery within oxygen transport membrane separator 20. A low oxygen recovery will increase available export power and yield a somewhat higher driving force at the expense of a larger compressor-turbine system. A minimum sufficient power is one that will drive compressor 12. Preferably, though, there is sufficient power to also run blowers 40 and 42, compress flue gases for sequestration and/or to produce power for export within generator 57. Although not illustrated, a heater could be inserted between oxygen transport membrane separator 20 and turboexpander 54 to increase power output. Alternatively, retentate stream 28 could be cooled to a lower temperature to simplify construction and material selection for turboexpander 54.

Figure 2:
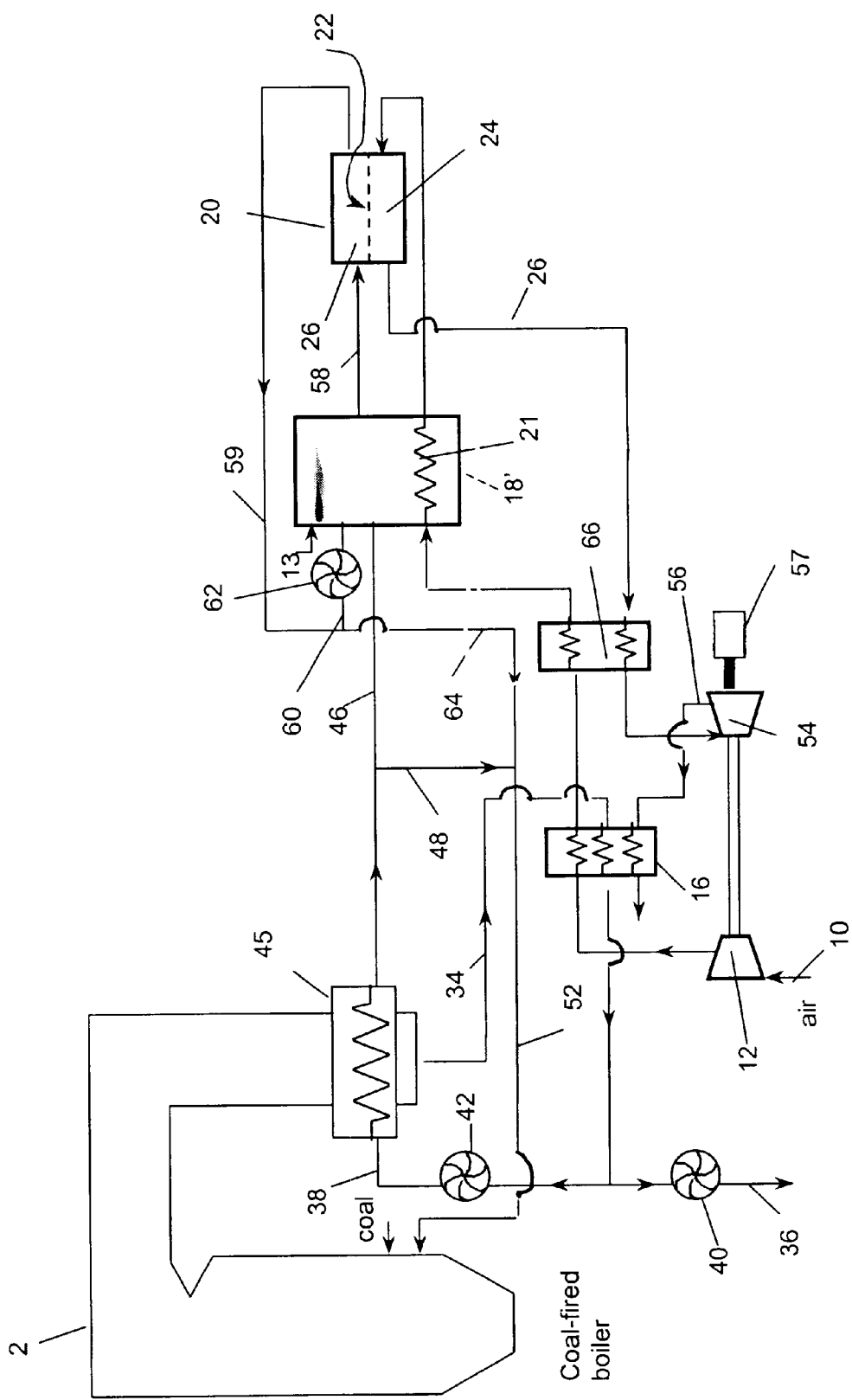
FIG. 2 is a schematic illustration of an apparatus for carrying out a method in accordance with an alternative embodiment of the present invention.

With reference to FIG. 2, a fired heater 18' is utilized that again has a pass provided by coil 21 for heating the incoming air. In such embodiment, a combustion product stream 58 is introduced into permeate side 26 of oxygen transport membrane separator 20 to produce an oxygen-containing combustion product stream 59. Part of oxygen-containing combustion product stream 59 is introduced as a stream 60 into fired heater 18' together with first subsidiary flue gas stream 46 to produce combustion product stream 58. Thus, unlike the previous embodiment, not all of the combustion product stream is introduced into the fired heater 18'. While this saves a heat exchange coil, an additional high temperature blower 62 is required to inject stream 60.

A remaining part of the oxygen-containing combustion product stream 59, as a stream 64, is combined with second subsidiary flue gas stream 48 to form diluted oxygen-containing stream 52 to support combustion of coal within boiler 2. Additionally, a heat exchanger 66 is optionally used to lower the temperature of retentate stream 28 to produce a lower inlet temperature for turboexpander 54. The advantage of this is that less expensive materials can be utilized for expander 54 at the expense of power output.

Figure 3:
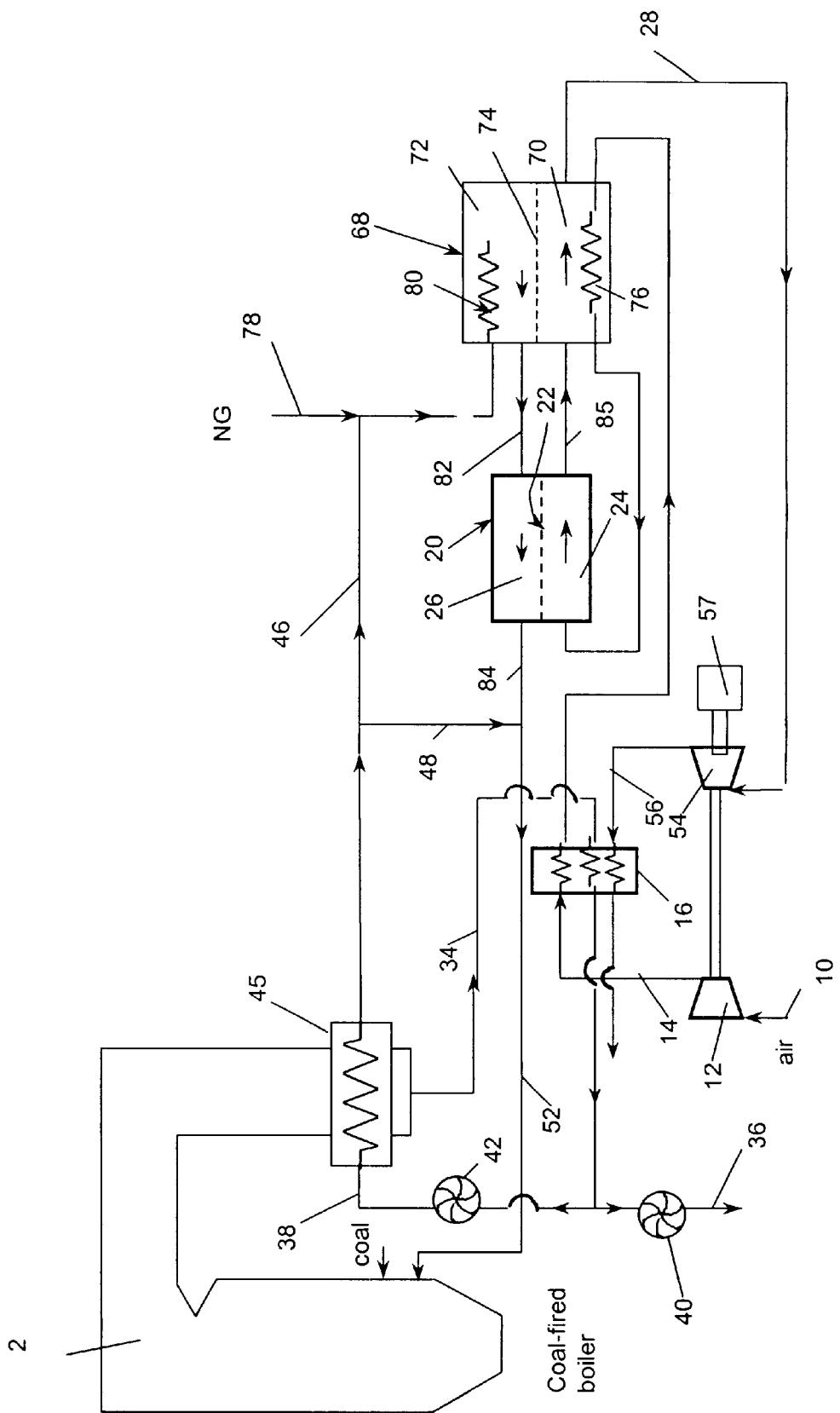
FIG. 3 is a schematic illustration of an apparatus for carrying out a method in accordance with a further alternative embodiment of the present invention.

With reference to FIG. 3, an oxygen transport membrane combustor-heater 68 is linked to oxygen transport membrane separator 20 in place of fired heaters 18 and 18' to conduct the first oxy-fuel combustion and thereby heat the incoming compressed air stream 14. The advantages of using oxygen transport membrane combustor-heater is that it permits up to one hundred percent recovery of the oxygen contained within the air to support combustion. Additionally, it allows for production of a high-purity nitrogen product. As indicated in U.S. Pat. No. 5,820,654, the oxygen transport membrane combustor-heater 68 can be combined with oxygen transport membrane separator 20 in a single apparatus. In this and in subsequent embodiments, the heat duty required to heat the oxygen transport membranes in the devices is provided by the heat generated from the first oxy-fuel combustion occurring with oxygen transport membrane combustor-heater 68. It is to be noted that subsequent embodiments of oxygen transport membrane combustor-heater 68 are designated by reference numbers 68', 68" and 68''' to indicate a slightly different arrangement of heat exchange coils containing in such devices.

As illustrated, oxygen transport membrane combustor-heater 68 has a retentate side 70 and a permeate side 72 separated by a ceramic membrane 74. Compressed air stream 14 passes through a heat exchange coil 76 located within retentate side 70 of oxygen transport membrane combustor-heater 68 where it is heated by combustion of fuel on permeate side 72 thereof.

For such purposes, a fuel stream 78, preferably natural gas, is introduced together with first subsidiary flue gas stream 46 into a heat exchange coil 80 located within permeate side 72 of oxygen transport membrane combustor-heater 68. The combustion, if desired, can be slightly fuel rich to increase oxygen recovery. The fuel reacts with typically all of the permeated oxygen to effect the first oxy-fuel combustion and thereby to produce combustion product stream 82 that is introduced into the permeate side 26 of oxygen transport membrane separator 20 where additional oxygen is permeated to thus form an oxygen-containing combustion product stream 84. Oxygen-containing combustion product stream 84 is combined with second subsidiary flue gas stream 48 to form diluted oxygen-containing stream 52 for introduction into boiler 2.

After a first separation of oxygen within oxygen transport membrane separator 20, an intermediate retentate stream 85 is formed that is introduced into combustor-heater 68, thereby to effect a second separation of the oxygen and to thus produce the retentate stream 28. In a like manner to previous embodiments, retentate stream 28 can be introduced into a turboexpander 54 to produce an exhaust stream 56 that in turn, can be used to partly heat incoming compressed air stream 14.

Figure 4:
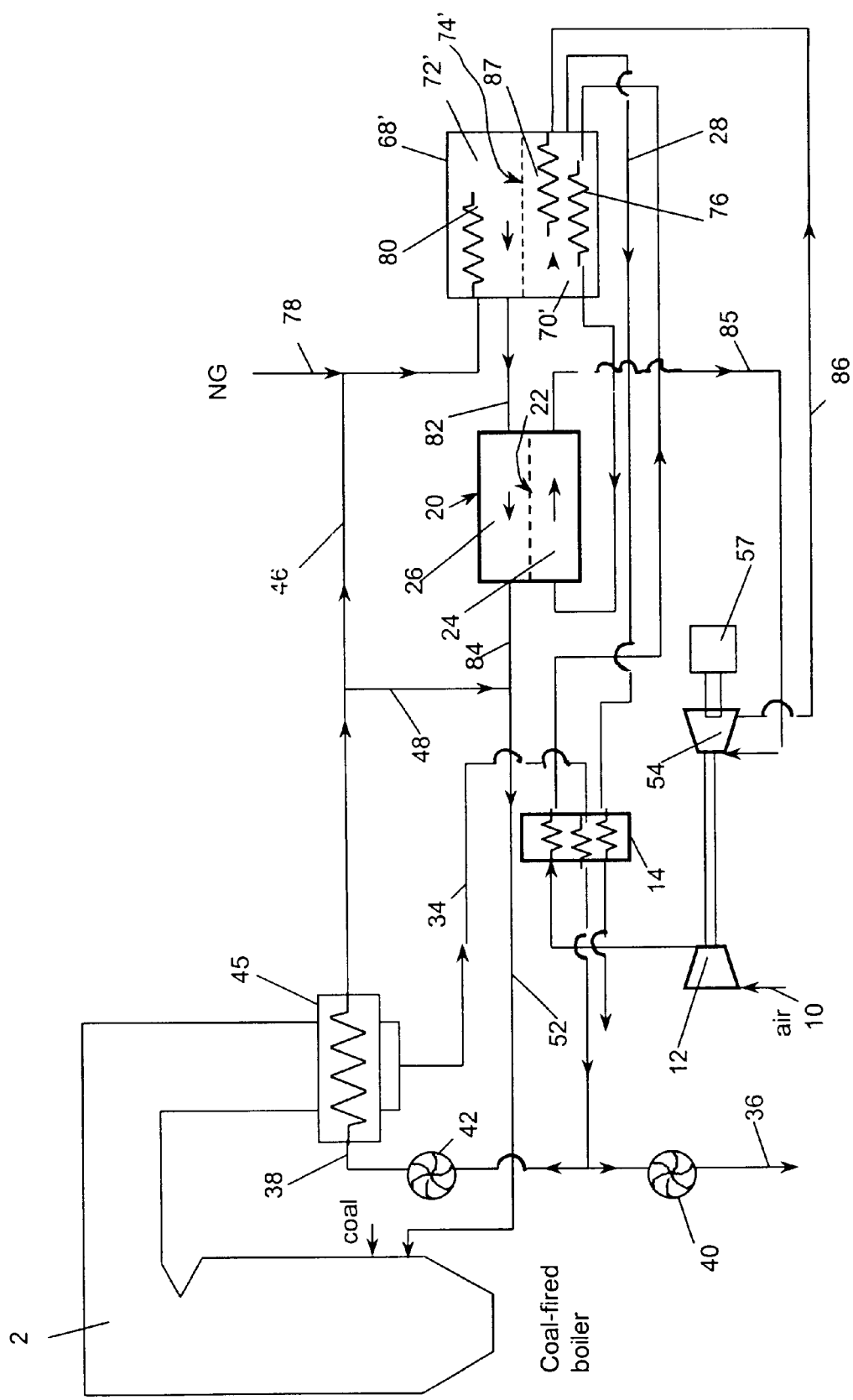
FIG. 4 is a schematic illustration of an apparatus for carrying out the method in accordance with a further alternative embodiment of the present invention.

With reference to FIG. 4, an alternative embodiment is shown that utilizes oxygen transport membrane combustor-heater 68'. In this embodiment, intermediate retentate stream 85 is introduced into expander 54. The retentate exhaust stream 86 of the turboexpander 54 is introduced into the retentate side 70' of oxygen transport membrane combustor-heater 68' through a heat exchange coil 87 where retentate exhaust stream 86 is heated to membrane operating temperature. Since the reaction with fuel produces very low oxygen partial pressures on the permeate side 72', there is adequate driving force available for the separation, even though the pressure of retentate exhaust stream 86 is low due to the expansion. More power can be extracted in this embodiment than the embodiment shown in FIG. 3 because intermediate retentate stream 85 has a higher mass flow rate than retentate stream 28. The reason for this is the fact that oxygen content of intermediate retentate stream 85 is higher than that of retentate stream 28.

Figure 5:
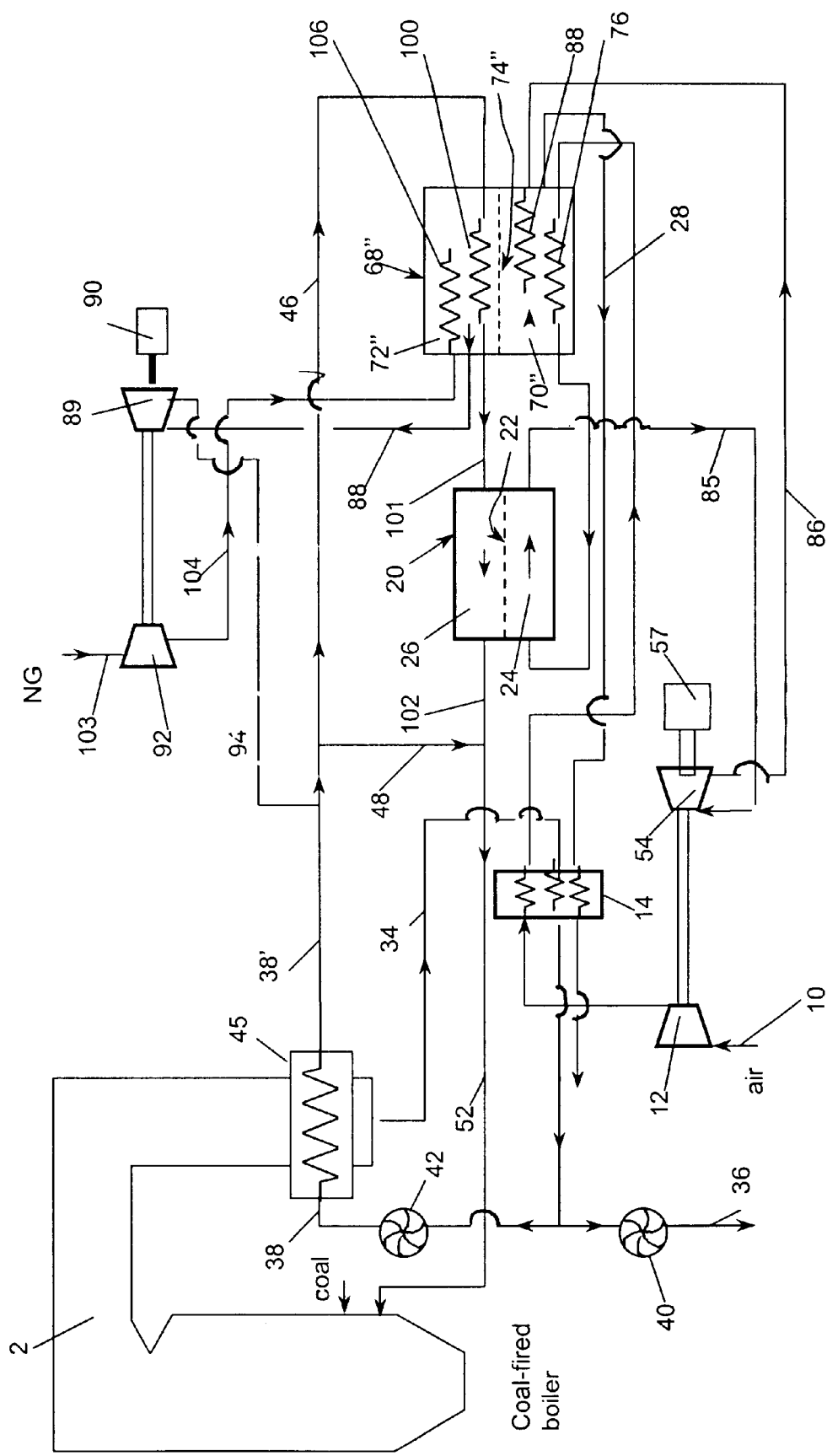
FIG. 5 is a schematic illustration of an apparatus for carrying out a method in accordance with a yet further alternative embodiment of the present invention.

With reference to FIG. 5, and oxygen transport membrane combustor-heater 68" that has permeate side 72" that is operated at elevated pressure. This permits power generation from the combustion products of the oxygen transport membrane combustor-heater 68".

A combustion product stream 88 is withdrawn from the permeate side 72" of oxygen transport membrane combustion-heater 68" and expanded within a turboexpander 89. The work of expansion may be extracted from turboexpander 89 by an electrical generator 90 and a natural gas compressor 92. The exhaust from turboexpander 89, as a stream 94, is introduced into flue gas stream 38 and divided into first and second subsidiary flue gas streams 46 and 48. First subsidiary gas stream 46 is heated within a heat exchange coil 100 located at permeate side 72" to produce a sweep gas stream 101 which is introduced into the permeate side 26 of oxygen transport membrane separator 20, thereby to produce an oxygen-containing sweep gas stream 102. Oxygen-containing sweep gas stream 102 is combined with second subsidiary flue gas stream 48 to form diluted oxygen-containing stream 52.

A fuel stream 103, natural gas, is compressed within natural gas compressor 92 to form a compressed natural gas stream 104. Compressed natural gas stream 104 is introduced into the permeate side 72" of oxygen transport membrane combustor-heater 69" by way of a heat exchange coil 106. The natural gas within compressed natural gas stream 104 reacts with a portion of the oxygen permeate to form combustion product stream 88 which has previously been described.

Figure 6:
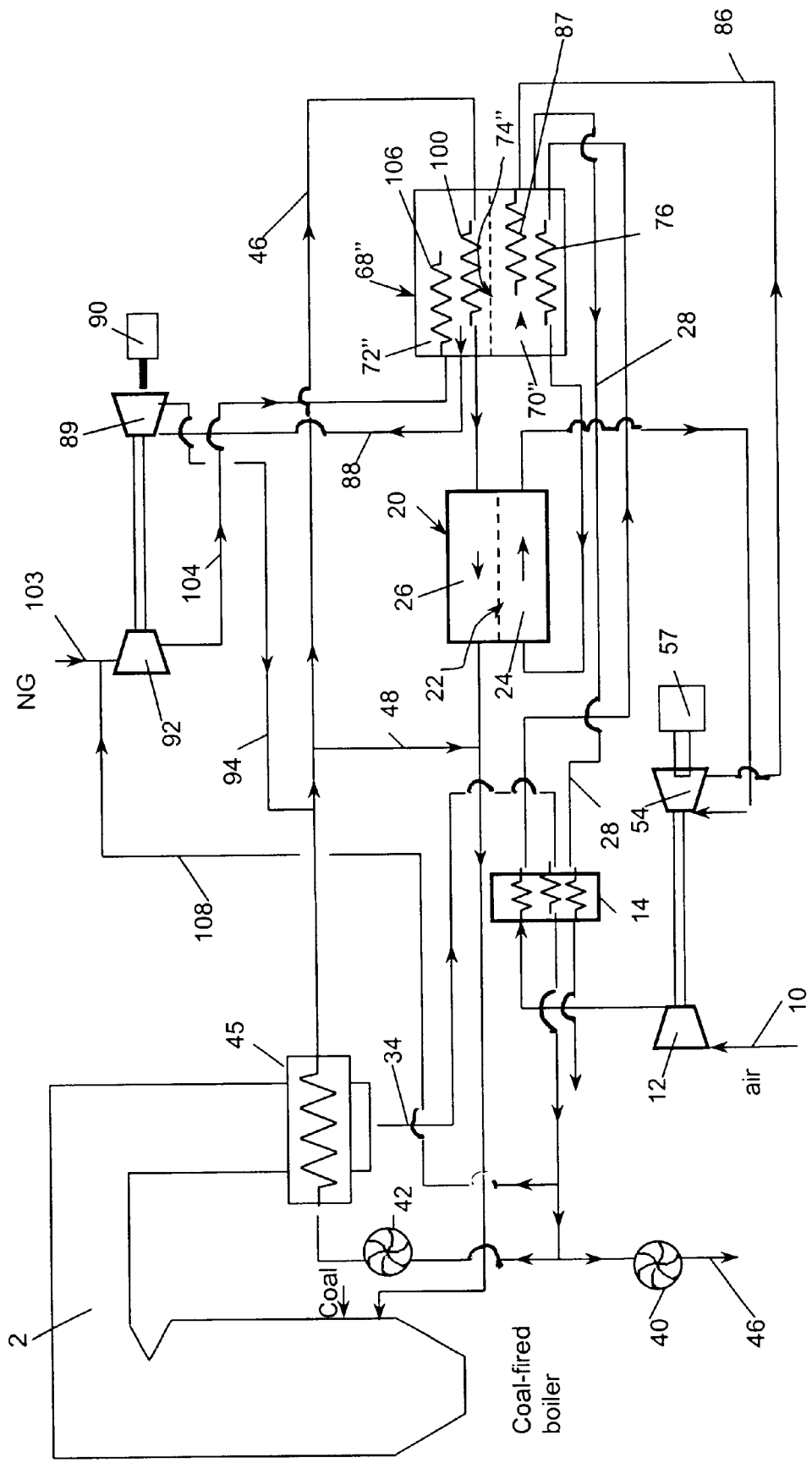
FIG. 6 is a schematic illustration of an apparatus for carrying out an alternative embodiment of the method of the present invention shown in FIG. 5.

With reference to FIG. 6, an alternative embodiment of the apparatus described with respect to FIG. 5 is shown in which carbon dioxide-containing flue gas of stream 34 is further divided to form a further flue gas stream 108. Further flue gas stream 108 is combined with fuel stream 103 prior to compression within compressor 92. This increases the mass flow of combustion products through turboexpander 89 to thereby increase its power output.

Figure 7:
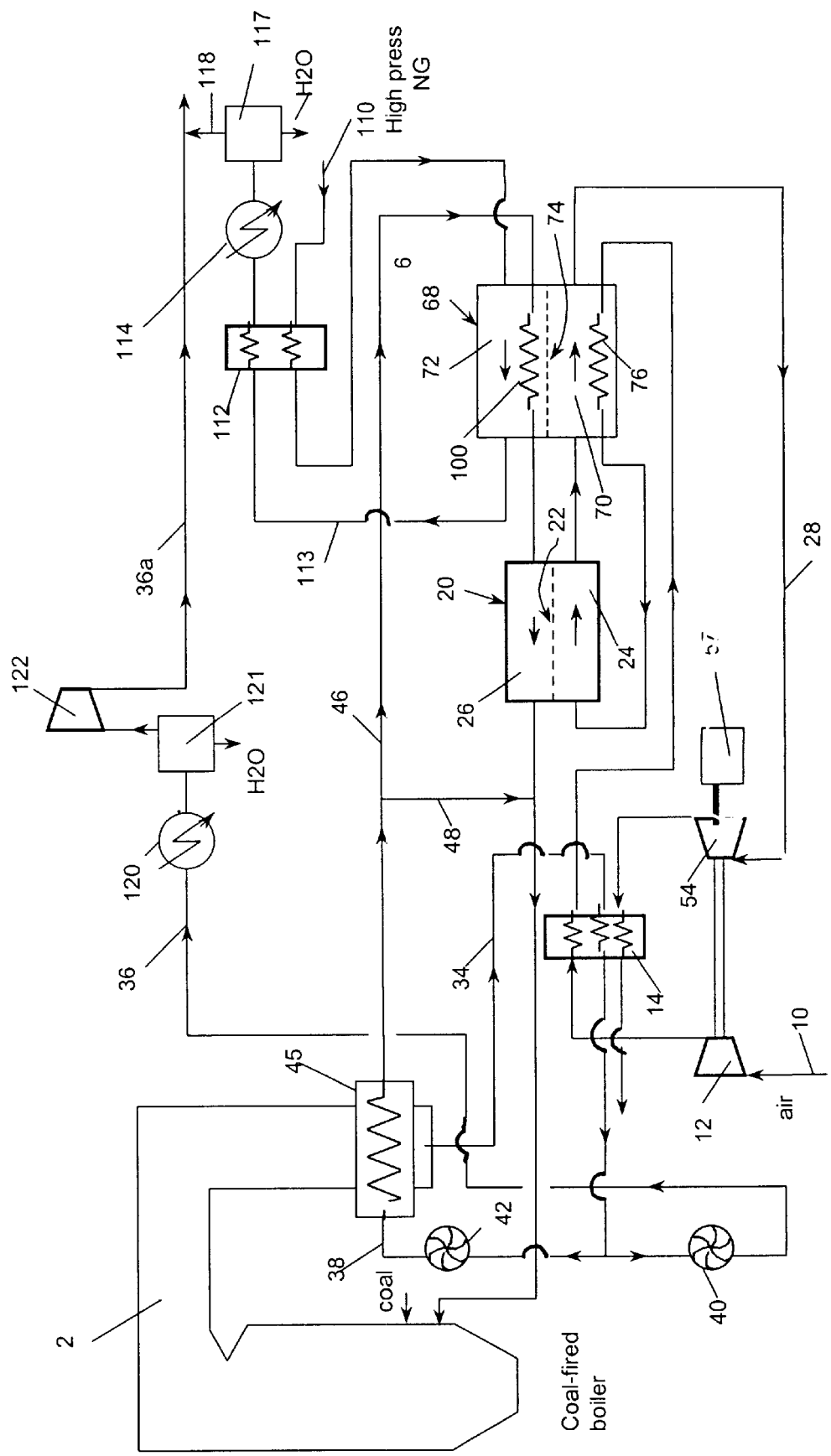
FIG. 7 is a schematic illustration of an apparatus for carrying out a yet still further alternative embodiment of the present invention.

With reference to FIG. 7, an alternative embodiment is shown in which a high pressure fuel stream 110, for instance, high pressure natural gas, is heated within a heat exchanger 112 and introduced into the permeate side 72 of oxygen transport membrane combustor-heater 68'''. The combustion product stream 113 is withdrawn from the permeate side 72''' of oxygen transport membrane combustor-heater 68''' and is then passed into heat exchanger 112 to heat incoming high pressure fuel stream 110. Combustion product stream 113 can then be cooled within a condenser 114 to condense water present with combustion product stream 113. After separation of the water in a pot 117, a carbon dioxide-containing stream 118 is formed that can be added to a compressed product stream 36a which then can be used in the downstream process or further compressed for $CO_2$ sequestration. Compressed product stream 36a is formed by condensing the water content of product stream 36 in a condenser 120. The condensed water is removed in separator pot 121 and a compressor 122 compresses product stream 36, thereby to form compressed product stream 36a. Compressed product stream is sufficiently compressed to be at least near sequestration pressure.

The following table 1 shows performance of a number of calculated examples using the flow sheets presented in FIGS. 1 through 5 compared with conventional air fired and oxy-fuel combustion using externally supplied oxygen. The results show that operating the system at higher air pressures will increase the power produced by turbine 54. Furthermore, when an oxygen transport membrane combustor-heater such as designated by reference number 68, is employed, the ability of the oxygen transport membrane to transfer oxygen from a retentate stream at a lower total pressure to a reacting stream at a higher total pressure enables improvements in the efficiency of the turbine 54. This is illustrated by a comparison of results for FIGS. 3 and 4. This ability can also be used to extract power from expanding the products of combustion if the permeate zone is operated at an elevated pressure (180 psia in the example). This leads to a further increase in power production and system efficiency as illustrated by the results for FIG. 5. Especially in a retrofit case it will be important not to decrease net power output from a retrofitted facility. Under these circumstances only modest penalties are suffered in heat rates for sequestrating the carbon dioxide produced by combustion.

The assumptions in the table were: compressor and turbine adiabatic efficiencies of 80%; compression with intercooling, sequestration pressure of 1500 psia; and a low content of volatile substances in the coal.

In the Table, the abbreviation "MM" is used to designate a magnitude of a million. "HHV" means high heating value. The row "Power Rankine Cycle MW" designates the power obtained in megawatts by applying the boiler 2 to generate steam for a Rankine Cycle. The power could in turn be used to generate electricity. The row labeled "Power Gas Turb. Cycle After Air Compression MW" refers to the power in megawatts less the power consumed by the air compressor. In this regard, the negative value in the column of such row relating to FIG. 2 indicates that the air compressor consumed more power than generated by the turbine. The row "Flue Gas Compression" represents the power consumed in compressing the carbon dioxide containing flue gas stream to inject it underground. The "Total Net Power" was determined by adding the power produced by the Rankine Cycle and the turbine and subtracting the power consumed in flue gas compression. "Heat Rate" is the total fuel consumed divided by the total net power produced in BTU/KW-HR.

TABLE

| | Air Fired | Cryo supp. O$_2$ | FIG.1 | FIG.2 | FIG.3 | FIG.4 | FIG.5 |
|---|---|---|---|---|---|---|---|
| Coal (MMBtU/hr, HHV) | 3,000 | 2,800 | 2,150 | 1,850 | 2,472 | 2,448 | 2,424 |
| Nat. Gas (MMBtu/hr, HHV) | | | 1,078 | 1,078 | 1,226 | 1,293 | 1,338 |
| Total Fuel (MMBtu/hr, HHV) | | | 3,238 | 2,938 | 3,698 | 3,741 | 3,772 |
| Oxygen Use MMCFH | | 6,109 | 6,888 | 6,174 | 7,478 | 7,561 | 7,602 |
| Percent Oxygen in flue gas to boiler (oxygen-containing stream 52 | | 26.5 | 19.2 | 16.2 | 20.0 | 19.8 | 19.6 |
| Percent of Flue gas in first subsidiary flue gas stream 46 | | | 100 | 100 | 14 | 14 | 14 |
| Temp. of oxygen containing stream (52 ° F.) | | 300 | 1,425 | 1,800 | 1,030 | 1,030 | 1,030 |
| Inlet Temp. (° F.) to turbine 54 | | | 1,660 | | 1,660 | 1660 | 1660 |
| Pressure of heated compressed air stream 14 (psia) | | | 60 | 37 | 147 | 147 | 147 |
| Power Rankine Cycle MW | 300 | 300 | 300 | 300 | 300 | 300 | 300 |
| Power Gas Turb. Cycle After Air Compression MW | | | 15 | (−38.5) | 66.6 | 80.1 | 89.1 |
| Cryoplant Power Consumption | | 50.9 | | | | | |
| Flue gas compression MW | | 25 | 24.7 | 21.3 | 29.2 | 29.7 | 30.3 |
| Total Net Power MW | | 224 | 290.7 | 240 | 337.4 | 350.4 | 358.8 |
| Heat Rate Without Sequestration | 10,000 | 11,245 | 10,266 | 11,243 | 10,088 | 9,842 | 9,694 |
| Net Heat Rate With Sequestration | | 12,500 | 11,140 | 12,240 | 10,960 | 10,676 | 10.512 |

In the examples of FIGS. 3 through 5, the utilization of oxygen contained in the air is relatively high at 87%. Reducing the utilization of the oxygen, that is increasing air flow, raises net power output and system efficiency. Also, the selected turbine inlet temperatures are very modest. A second oxygen fired combustor could be added to elevate that temperature and thereby increase power output and cycle efficiency.

While the present invention has been described in reference to a preferred embodiment, it will occur to those skilled in the art, numerous changes, additions and omissions can be made without departing from the spirit and scope of the present invention.

We claim:

1. A method of firing a heat consuming device comprising:
   compressing air to form a compressed air stream;
   heating the compressed air stream to form a heated compressed air stream;
   the compressed air stream being heated at least in part by a first oxy-fuel combustion;
   separating oxygen from the heated compressed air stream by an electrochemical separation process involving oxygen ion transport through a ceramic material to produce an oxygen permeate stream and a retentate stream;
   firing the heat consuming device by a second oxy-fuel combustion producing a carbon dioxide-containing flue gas;
   supporting the first and second oxy-fuel combustion with oxygen contained in the oxygen permeate;
   the oxygen being introduced into the second oxy-fuel combustion as a diluted oxygen stream formed by diluting the oxygen permeate with a diluent formed at least in part by recycling part of the carbon dioxide-containing flue gas; and
   extracting a product stream from the heat consuming device also formed from a remaining part of said carbon dioxide-containing flue gas.

2. The method of claim 1 wherein the oxygen content of said diluted oxygen stream is between about 10 volume percent and about 40 volume percent.

3. The method of claim 1 wherein the oxygen content of said diluted oxygen stream is between about 15 volume percent and about 25 volume percent.

4. The method of claim 1, wherein:
   the oxygen is separated from the heated compressed air stream within an oxygen transport membrane separator having at least one oxygen transport membrane having a retentate side and a permeate side;
   at least part of a flue gas stream formed from said part of said carbon dioxide-containing flue gas is introduced to the permeate side of the at least one oxygen transport membrane as a sweep gas stream, thereby to form said oxygen-containing sweep gas stream; and
   the oxygen-containing sweep gas stream is introduced into a fired heater to support said first oxy-fuel combustion with a portion of the oxygen contained therein, thereby to produce a combustion product stream;
   said diluted oxygen-containing stream is formed at least in part by combustion product stream.

5. The method of claim 1, wherein:
   the oxygen is separated from the heated compressed air stream within at least one oxygen transport membrane having a retentate side and a permeate side;

a combustion product stream is introduced to the permeate side of said at least one oxygen transport membrane to form an oxygen-containing combustion product stream;

part of said oxygen-containing combustion product stream and at least part of a flue gas stream formed from said part of said carbon dioxide-containing flue gas are introduced into a combustion chamber of a fired heater thereby to support said first oxy-fuel combustion and to form said combustion product stream; and said diluted oxygen-containing stream is formed at least in part from a remaining part of said oxygen-containing combustion product stream.

6. The method of claim 1, wherein:

the oxygen is separated from the heated compressed air stream within first and second separations occurring in an oxygen transport membrane separator and an oxygen transport membrane combustor-heater, respectively;

each of the oxygen transport membrane and the oxygen transport membrane combustor heater has opposed retentate and permeate sides;

the compressed air stream is heated in the oxygen transport membrane combustor-heater in a heat exchanger located at the retentate side thereof; and the first oxy-fuel combustion comprises a combustion of a fuel within the permeate side of said oxygen transport membrane combustor-heater.

7. The method of claim 6, wherein:

a fuel stream and at least part of a flue gas stream formed from the part of the carbon dioxide-containing flue gas are introduced to the permeate side of the oxygen transport membrane combustor-heater to react with a portion of the oxygen permeate, thereby to produce said first oxy-fuel combustion and a combustion product stream;

said first separation produces an intermediate retentate stream that is in turn introduced into the retentate side of said oxygen transport membrane combustor-heater, thereby to effect said second separation and to form said retentate stream;

the combustion product stream is introduced to the permeate side of said oxygen transport membrane separator, thereby to form an oxygen-containing combustion product stream; and said diluted oxygen-containing stream is formed at least in part from said oxygen-containing combustion product stream.

8. The method of claim 6, wherein:

a fuel stream, along with at least part of a flue gas stream formed from at least a portion of said part of said carbon dioxide-containing flue gas, is introduced to the permeate side of the oxygen transport membrane combustor-heater to react with a portion of the oxygen permeate, thereby to produce said first oxy-fuel combustion and a combustion product stream;

said first separation produces an intermediate retentate stream;

the intermediate retentate stream is expanded with the performance of work, thereby to produce a retentate exhaust stream;

the retentate exhaust stream is introduced into the retentate side of said oxygen transport membrane combustor-heater, thereby to effect said second separation and to form said retentate stream;

said combustion product stream is introduced to the permeate side of said oxygen transport membrane separator, thereby to form an oxygen-containing combustion product stream; and said diluted oxygen-containing stream is formed at least in part by said oxygen-containing combustion product stream.

9. The method of claim 6, wherein:

a combustion product stream is withdrawn from the permeate side of the combustor-heater, expanded with the performance of work and then introduced into a flue gas stream formed from at least a portion of said part of said carbon dioxide-containing flue gas;

a fuel stream is compressed to form a compressed fuel stream that is introduced into the permeate side of the combustor-heater;

the work of the expansion is applied at least to the compression of the fuel;

at least part of said flue gas stream, after introduction of said combustion product stream, is heated by said first oxy-fuel combustion and introduced to the permeate side of said oxygen transport membrane separator as a sweep gas stream, thereby to form an oxygen-containing sweep gas stream;

said first separation produces an intermediate retentate stream;

the intermediate retentate stream is expanded with the performance of work, thereby to produce a retentate exhaust stream;

the retentate exhaust stream is introduced to the retentate side of said oxygen transport membrane combustor-heater, thereby to effect said second separation and to form said retentate stream; and said diluted oxygen-containing stream is formed at least in part by said oxygen-containing sweep gas stream.

10. The method of claim 9, wherein:

said flue gas stream is formed from said portion of said part of said carbon dioxide-containing flue gas;

a further flue gas stream is also formed from a remaining portion of said part of said carbon dioxide-containing flue gas; and said further flue gas stream is combined with the fuel gas stream prior to compression of the fuel gas stream.

11. The method of claim 6, wherein:

a combustion product stream is removed from the permeate side of said oxygen transport membrane combustor-heater and passed into indirect heat exchange with said fuel stream;

said combustion product stream is cooled and water is separated from said combustion product stream;

water is separated from said product stream;

after separation of said water, said product stream is compressed to form a compressed product stream;

said combustion product stream is introduced into said product stream;

at least part of a flue gas stream, formed from said part of the oxygen-containing flue gas, is heated by said first oxy-fuel combustion and introduced to the permeate side of said oxygen transport membrane separator as a sweep gas stream, thereby to form an oxygen-containing sweep gas stream;

said first separation produces an intermediate retentate stream that is introduced to the retentate side of the oxygen transport membrane combustor-heater, thereby to effect said second separation and to produce said retentate stream; and said diluted oxygen-containing stream is formed at least in part by said oxygen-containing sweep gas stream.

12. The method of claim 4 or claim 5 or claim 7 or claim 11, wherein:

said retentate stream is expanded with the performance of work;

the work of the expansion is applied at least to the compression of the air stream; and an exhaust stream composed of said retentate stream after expansion is passed in indirect heat exchange with said compressed air stream to partially heat said compressed air stream.

13. The method of claim 12, wherein:

said flue gas stream is divided into first and second subsidiary flue gas streams;

said at least part of said flue gas stream is said first subsidiary flue gas stream; and said diluted oxygen-containing stream is also formed from said second subsidiary flue gas stream.

14. The method of claim 8 or claim 9 or claim 10, further comprising:

applying the work of the expansion produced through expansion of said intermediate retentate stream at least to the compression of the air stream; and passing said retentate stream in indirect heat exchange with said compressed air stream to partially heat said compressed air stream.

15. The method of claim 14, wherein:

said flue gas stream is divided into first and second subsidiary flue gas streams;

said at least part of said flue gas stream is said first subsidiary flue gas stream; and said diluted oxygen-containing stream is also formed from said second subsidiary flue gas stream.

16. The method of claim 1 or claim 4 or claim 5 or claim 7 or claim 8 or claim 9 or claim 10 or claim 11, wherein:

said carbon dioxide-containing flue gas is removed from a stack of said heat consuming device as a stream of the carbon dioxide-containing flue gas;

said carbon dioxide-containing flue gas as a stream is passed in indirect heat exchange with the compressed air stream and then divided into the flue gas stream and the product stream; and the flue gas stream is reheated in a recuperative heat exchanger located in a stack of the heat consuming device.

17. The method of claim 5 or claim 6 or claim 7 or claim 8 or claim 9 or claim 10 or claim 11, wherein said second oxy-fuel combustion is the combustion of coal or fuel oil.

18. The method of claim 1 where said heat consuming device is a boiler.

* * * * *